United States Patent
Paura et al.

(10) Patent No.: US 11,815,157 B2
(45) Date of Patent: Nov. 14, 2023

(54) METHODS OF INSTALLING A MECHANICAL DAMPER APPARATUS

(71) Applicant: General Electric Renovables Espana, S.L., Barcelona (ES)

(72) Inventors: Ingo Paura, Salzbergen (DE); Emily Jacob Palmer, Chicago, IL (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/991,128

(22) Filed: Nov. 21, 2022

(65) Prior Publication Data
US 2023/0167875 A1  Jun. 1, 2023

(30) Foreign Application Priority Data
Nov. 29, 2021 (EP) ..................... 21211026

(51) Int. Cl.
*F16F 9/54* (2006.01)
*F03D 13/20* (2016.01)
*F03D 80/00* (2016.01)

(52) U.S. Cl.
CPC ............... *F16F 9/54* (2013.01); *F03D 13/20* (2016.05); *F03D 80/00* (2016.05); *F05B 2260/964* (2013.01)

(58) Field of Classification Search
CPC .... F05B 2260/964; F03D 13/20; F03D 80/00; F16F 9/54
See application file for complete search history.

(56) References Cited

U.S. PATENT DOCUMENTS

| 7,220,104 B2 | 5/2007 | Zheng et al. |
| 2013/0259684 A1 | 10/2013 | Hedeen et al. |
| 2021/0246880 A1* | 8/2021 | Johansen ................ F03D 13/10 |

FOREIGN PATENT DOCUMENTS

| DE | 102018100868 B3 | 2/2019 |
| EP | 1677003 A2 | 7/2006 |
| EP | 2644886 A2 | 10/2013 |

OTHER PUBLICATIONS

European Search Report Corresponding to EP21211026 dated May 6, 2022.
Elebia Autohooks, Lifting Hooks for Cranes, Barcelona Spain, 19 Pages. Retrieved Oct. 6, 2022 from website https://elebia.com/lifting-hooks-for-cranes/.
Youtube Video, Elebia Autohooks, Second Generation, Sep. 7, 2012. Retrieved Oct. 6, 2022 from websites: https://youtu.be/jgPhdUOKP3M https://www.youtube.com/watch?y=jgPhdUOKP3M &feature=emb_rel_pause.

* cited by examiner

*Primary Examiner* — Moshe Wilensky
(74) *Attorney, Agent, or Firm* — Dority & Manning, P.A.

(57) ABSTRACT

It is provided methods of installing a mechanical damper apparatus to an external surface of a tower of a wind turbine, the tower being in an erect state.

13 Claims, 7 Drawing Sheets

METHODS OF INSTALLING A MECHANICAL DAMPER APPARATUS

The present disclosure relates generally to methods of installing a mechanical damper apparatus to a tower of a wind turbine, and more particularly, to methods of installing a mechanical damper apparatus to a tower of a wind turbine when the tower is in an erect state.

BACKGROUND

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Wind turbine towers, in specific contexts, are at risk of vortex-induced vibrations. Vortex-induced vibrations are structural vibrations that can occur due to the shedding of flow vortices when a fluid flow passes around a structure. Increasing rotor height and diameter of wind turbines makes vortex-induced vibrations increasingly important.

Vortex-induced vibrations are important when the tower does not have the rotor-nacelle assembly or a substantial portion thereof, for example, when the tower is stored or transported erect, during installation process before the installation of the rotor-nacelle assembly, or during service such as during retrofits, or maintenance when the rotor-nacelle assembly, or a major portion thereof, is absent. During these times, the tower acts as a beam clamped at one of its ends and subjected to a wind flow. Because of the vortex shedding developing in the tower wake, the tower may start to oscillate.

Mechanical dampers, e.g. tuned mass damper, are used to mitigate vortex-induced vibrations. In the cases where the tower does not have a pre-fitted mechanical damper, one can be installed. Improvements to the practical realization of mechanical dampers, e.g. to the process of fitting a mechanical damper, would create benefit for existing wind turbines, and future wind turbines. For example, if a quick and easy method of installing a mechanical damper is available, then any need for pre-fitted mechanical dampers is even reduced. The subject-matter described herein, is intended to provide improved methods of installing a mechanical damper apparatus to a tower of a wind turbine, and in particular, improved methods of installing a mechanical damper apparatus to a tower of a wind turbine when the tower is in an erect state.

BRIEF DESCRIPTION

Aspects and advantages of the invention will be set forth in part in the following description, or may be obvious from the description, or may be learned through practice of the invention.

According to an aspect, there is provided a method of installing a mechanical damper apparatus to an external surface of a tower of a wind turbine, the tower being in an erect state, the method including: passing a first rope-type guide element through a first receiving opening arranged at a first fixing point on the external surface of the tower, the first fixing point being for mounting the mechanical damper apparatus, at a mounting position, to the external surface of the tower; and while keeping the first rope-type guide element passed through the first receiving opening, performing the following: lowering a first end portion of the first rope-type guide element to a first height position lower than the first fixing point; attaching the first end portion of the first rope-type guide element to a protruding portion of a first connector of the mechanical damper apparatus, the first connector being configured for mating with the first receiving opening; and lifting the mechanical damper apparatus, and mounting the mechanical damper apparatus to the external surface of the tower; wherein mounting the mechanical damper apparatus to the tower includes guiding the protruding portion of the first connector into the first receiving opening by tensioning the first rope-type guide element.

According to a further aspect, there is provided a method of installing a mechanical damper apparatus to an external surface of a tower of a wind turbine, the tower being in an erect state, the method including: passing a first rope-type guide element through a receiving portion of a fourth connector; and while keeping the first rope-type guide element passed through the receiving portion of the fourth connector, performing the following: attaching a first end portion of the first rope-type guide element to a protruding portion of a third connector of the mechanical damper apparatus, the third connector configured for mating with the fourth connector, and attaching the fourth connector to a first rope-type hoist element; lifting the fourth connector, using the first rope-type hoist element, to a first receiving opening arranged at a first fixing point on the external surface of the tower, the first fixing point being for mounting the mechanical damper apparatus, at a mounting position, to the external surface of the tower; fixing the fourth connector to the tower at the first fixing point; and lifting the mechanical damper apparatus, and mounting the mechanical damper apparatus to the external surface of the tower; wherein mounting the mechanical damper apparatus to the tower includes guiding the protruding portion of the third connector into the receiving portion of the fourth connector by tensioning the first rope-type guide element.

These and other aspects, embodiments, examples and advantages of the present invention will become better understood with reference to the following description and appended claims.

BRIEF DESCRIPTION OF THE DRAWINGS

A full and enabling disclosure, including the best mode thereof, directed to the person skilled in the art, is set forth in the specification, which makes reference to the appended figures, in which.

DETAILED DESCRIPTION

Figure 1:
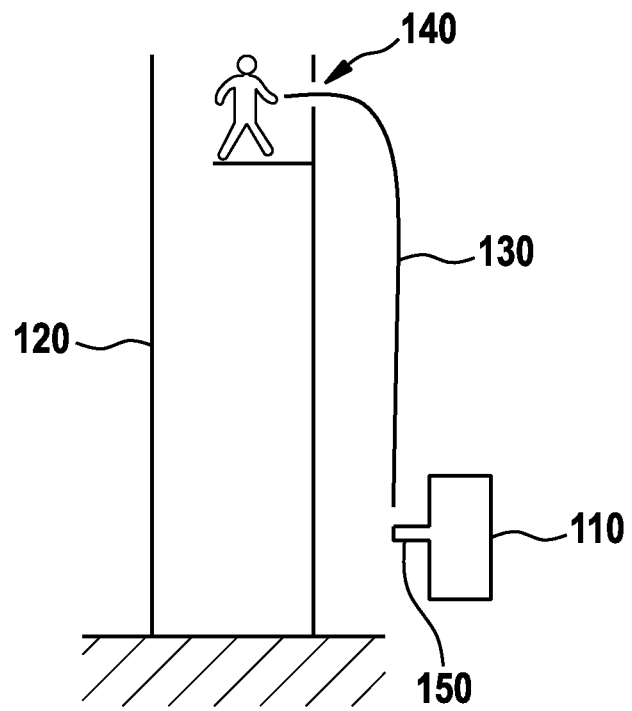
FIG. 1 is a diagrammatic rendering relating to the attaching of a first end portion of a first rope-type guide element 130 to a protruding portion of a first connector 150 of a mechanical damper apparatus 110 according to an aspect described herein.

Reference now will be made in detail to embodiments, one or more examples of which are illustrated in the drawings. Each example is provided for explaining the present disclosure. Features illustrated or described as part of one example or embodiment can be used with another example or embodiment.

As discussed above, the present disclosure relates to methods of installing a mechanical damper apparatus to a tower of a wind turbine, and in particular, improved methods of installing a mechanical damper apparatus to a tower of a wind turbine when the tower is in an erect state.

Accordingly, the present disclosed methods are especially beneficial during periods in which a wind turbine tower temporarily requires protection from undesirable oscillations, e.g. vortex-induced vibrations. Such temporary periods may for example be periods in which a wind turbine tower is stored (e.g. at quay side) or transported erect (e.g. on a ship), periods between the erection of the wind turbine tower and the installation of the nacelle/rotor blades, and periods in which a nacelle/rotor blades are removed (e.g. for maintenance/retrofit).

Even more particularly, the present disclosure relates to methods of installing a mechanical damper apparatus to an external surface of a tower of a wind turbine. Accordingly, a time period during which the wind turbine tower is unprotected from undesirable oscillations, in particular vortex-induced vibrations, can be reduced.

In general, a mechanical damper apparatus as described herein may be understood as a friction damper and/or a tuned mass damper. A mechanical damper apparatus as described herein may be understood as being configured for damping transverse oscillations and/or vortex induced vibrations.

In an example, a mechanical damper apparatus is installed to a tower of a wind turbine, e.g. mounted at a mounting position, for damping a (e.g. first or second) mode of vibration of the tower.

According to an aspect, there is provided a method of installing a mechanical damper apparatus 110 to an external surface of a tower 120 of a wind turbine, the tower 120 being in an erect state, the method including: passing 1010 a first rope-type guide element 130 through a first receiving opening 140 arranged at a first fixing point on the external surface of the tower 120, the first fixing point being for mounting the mechanical damper apparatus 110, at a mounting position, to the external surface of the tower 120; and while keeping the first rope-type guide element 130 passed through the first receiving opening 140, performing the following: lowering 1020 a first end portion of the first rope-type guide element 130 to a first height position lower than the first fixing point; attaching 1030 the first end portion of the first rope-type guide element 130 to a protruding portion of a first connector 150 of the mechanical damper apparatus 110, the first connector 150 being configured for mating with the first receiving opening 140; and lifting 1040 the mechanical damper apparatus 110, and mounting 1050 the mechanical damper apparatus 110 to the external surface of the tower 120; wherein mounting 1050 the mechanical damper apparatus 110 to the tower 120 includes guiding the protruding portion of the first connector 150 into the first receiving opening 140 by tensioning the first rope-type guide element 130.

Installing a mechanical damper apparatus 110 to an external surface of a tower 120 of a wind turbine, may be understood as installing the mechanical damper apparatus 110 such that the mechanical damper apparatus 110 is fixed to an outside portion of the tower 120.

The mechanical damper apparatus 110 may be understood to be configured to damp oscillations of the tower 120, when installed to an external surface of the tower 120.

An erect state may be understood as a state where the tower (or a portion of the tower) is in an upright or standing orientation, or the tower (or a portion of the tower) is oriented such that the axis of the tower is substantially parallel to (e.g. within 5 or 10 degrees of) a direction of gravity, either temporarily (e.g. storage, transport, and/or prior to being in service/in operation; or permanently (e.g. constructed, commissioned, ready for service/in operation, and/or in service/in operation).

According to an embodiment, passing 1010 a first rope-type guide element 130 through a first receiving opening 140 may be understood as threading or sliding, one end (e.g. a first end) of the first rope-type guide element 130 through the first receiving opening 140.

The first receiving opening 140 can be understood as an opening configured to receive or mate with a protruding portion of a first connector 150 of the mechanical damper apparatus 110.

For example, the first receiving opening 140 is a through-hole in the tower 120 configured for receiving the protruding portion of the first connector 150. The first connector 150 and the first receiving opening 140 can be understood as being configured for mating with each other.

In an example, the first connector 150 is a pin-type element, and the first receiving opening 140 is an eyebolt-type element. In a further example, the first connector 150 may be a male-type connector and the first receiving opening 140 may be a female-type connector.

As an illustrative example, the first connector 150 may be a bolt or bolt-type connector, or the protruding portion of the first connector 150 may be the threaded portion and/or shank portion of a bolt or bolt-type connector.

As a further illustrative example, the first receiving opening 140 may be a through-hole in the tower, e.g. a wall portion of the tower, having dimension(s) (e.g. diameter, length) for receiving the threaded portion and/or shank portion of a bolt or bolt-type connector.

As can be understood by the skilled person, other connection devices can be used in place of a bolt or bolt-type connector, for example, a clevis pin-type connector (which may be secured by a split pin-type securing device).

According to an embodiment, the first fixing point on the external surface of the tower 120 for mounting the mechanical damper apparatus 110 is such that the mechanical damper apparatus 110 when mounted to the tower 120 at (at least) the first fixing point, the mechanical damper apparatus is designed or determined to (optimally or maximally) reduce transverse oscillations and/or vortex-induced vibrations.

According to an embodiment, the first rope-type guide element 130 can be understood to be an element configured for guiding the protruding portion of the first connector 150 into the first receiving opening 140.

According to an embodiment, the first rope-type guide element 130 is a guide element having a form of a rope, string, cable, cord and/or wire. In an example, the first rope-type guide element 130 is a rope, a string, a cable, a cord, a chain, a twine, a thread and a wire.

In an example, the first rope-type guide element 130 has a diameter less than a diameter of the first receiving opening 140. In an example, the first rope-type guide element 130 has a length at least 50% of a height of the tower 120, preferably at least 75% of a height of the tower 120, or more preferably at least a height of the tower 120.

The first height position to which the first end portion of the first rope-type guide element 130 is lowered 1020 to may be understood as a position nearer to ground level or sea level, or nearer to a base of the tower 120, relative to the first fixing point. In an example, the first height position is a position at a base portion of the tower 120 or within 10 m of a base of the tower 120.

According to an embodiment, attaching 1030 the first end portion of the first rope-type guide element 130 to the protruding portion of the first connector 150 of the mechanical damper apparatus 110 may be understood as reversibly or non-permanently attaching the first end portion of the first rope-type guide element 130 to the protruding portion of the first connector 150 of the mechanical damper apparatus 110.

For example, the first end portion of the first rope-type guide element 130 may include a hook-type end attachment, and the protruding portion of the first connector 150 of the mechanical damper apparatus 110 may include an eyebolt-type attachment, such that the hook-type end attachment of the first rope-type guide element 130 may be reversibly or non-permanently attached to the eyebolt-type attachment of the protruding portion of the first connector 150 of the mechanical damper apparatus 110.

As can be understood by the skilled person, other methods of attachment can be used, for example other reversible/non-permanent attachment methods (e.g. the protruding portion of the first connector 150 having an eyebolt, and tying/knotting the first end portion of the first rope-type guide element 130 to the eyebolt of the protruding portion of the first connector 150), or permanent attachment methods (e.g. adhesive) or semi-permanent attachment methods (e.g. adhesive tape).

Lifting 1040 the mechanical damper apparatus 110 may be understood as a carrying a majority portion of the weight of the mechanical damper apparatus 110 in an upwards direction, e.g. from a base portion of the tower 120 towards the first fixing point. In an example, the mechanical damper apparatus 110 may be lifted using a lifting apparatus, e.g. a crane.

Mounting 1050 the mechanical damper apparatus 110 to the external surface of the tower 120 may be understood as reversibly or non-permanently mounting the mechanical damper apparatus 110 to the external surface of the tower 120. For example, the mechanical damper apparatus 110 may be bolted onto the external surface of the tower 120.

Guiding the protruding portion of the first connector 150 to the first receiving opening 140 by tensioning the first rope-type guide element 130 may be understood to effect a (pulling) force on the protruding portion of the first connector 150 towards the first receiving opening 140.

It may be understood that during mounting 1050 of the mechanical damper apparatus 110 to the tower 120, an alignment of the first connector 150 of the mechanical damper apparatus 110 and the first receiving opening 140 is provided by a combination of a tension of the first rope-type guide element 130, and the first rope-type guide element 130 being in a state of passed through the first receiving opening 140, and the first rope-type guide element 130 being attached at the first end portion of the first rope-type guide element 130 to the protruding portion of the first connector 150.

Accordingly, the protruding portion of the first connector 150 may be guided into the first receiving opening 140, by an operator, easily, e.g. when view is partially or fully obstructed (e.g. without direct line of sight), and/or when the operator and mechanical damper apparatus are distant or remote from each other. Further, the mounting operation may be carried out remotely, e.g. from the ground and/or from inside the tower. Thus, an improved method of installation is provided.

According to an embodiment, the method includes, after guiding the portion of the first connector 150 into the first receiving opening 140, securing the first connector 150 to the tower 120 from inside the tower 120.

For example, the first connector 150 may extend through a wall of the tower 120 such that an operator on the inside of the tower 120 may secure the first connector 150 to the tower 120.

In a further example, the first receiving opening 140, and/or the first connector 150 after being guided into the first receiving opening 140, may be accessible from an operator on the inside of the tower 120, e.g. via an access opening in the tower 120, such as a window or door within the tower 120.

According to an embodiment, mounting 1050 the mechanical damper apparatus 110 to the tower 120 includes securing the protruding portion of the first connector 150 within the first receiving opening 140.

For example, where the protruding portion of the first connector 150 is a bolt-type connector, an operator may secure the first connector 150 to the tower 120 using a nut-type securing device.

In a further example, where the protruding portion of the first connector 150 is a clevis pin-type connector, an operator may secure the first connector 150 to the tower 120 using a split pin-type securing device.

According to an embodiment, tensioning the first rope-type guide element 130 includes pulling on a second end portion of the first rope-type guide element 130, thereby increasing a tension of the first rope-type guide element 130.

It may be understood that a (guiding) force on the protruding portion of the first connector 150 effected by tension of the first rope-type guide element 130 is in the direction of the first receiving opening 140.

According to an embodiment, lowering 1020 the first end portion of the first rope-type guide element 130 to a first height position lower than the first fixing point includes letting out the first rope-type guide element 130 from inside the tower 120.

In an example, an operator inside the tower 120 may lower 1020 the first end portion of the first rope-type guide element 130 to the first height position.

In a further example, the first end portion of the first rope-type guide element 130 is lowered 1020 to the first height while keeping the first rope-type guide element 130 passed through the first receiving opening 140.

It may be understood that lowering 1020 the first end portion of the first rope-type guide element 130, facilitates a positioning of the first end portion of the first rope-type guide element 130 for being (easily) attached to the protruding portion of the first connector 150, e.g. positions the first end portion of the first rope-type guide element 130 in proximity to the mechanical damper apparatus 110, e.g. at a base area of the tower 120, e.g. at substantially ground level or sea level.

According to an embodiment, the mechanical damper apparatus 110 includes a plurality of connectors 150, 350. According to an embodiment, there are a plurality of rope-type guide elements 130, 330 for guiding a plurality of connectors 150, 350 into a plurality of receiving openings 140, 340.

According to an embodiment, the mechanical damper apparatus 110 includes a second connector 350 configured for mating with a second receiving opening 340. According to an embodiment, the second receiving opening 340 is arranged at a second fixing point, the second fixing point being for mounting the mechanical damper apparatus 110, at the mounting position, to the external surface of the tower 120.

According to an embodiment, a method provided includes passing a second rope-type guide element 330 through the second receiving opening 340; and while keeping the second rope-type guide element 330 passed through the second receiving opening 340, and prior to the lifting 1040 of the mechanical damper apparatus 110, and prior to the mounting 1050 of the mechanical damper apparatus 110 to the tower 120, performing the following: lowering a first end portion of the second rope-type guide element 330 to a second height position lower than the second fixing point; and attaching the first end portion of the second rope-type guide element 330 to a protruding portion of the second connector 350; wherein mounting 1050 the mechanical damper apparatus 110 to the tower 120 includes: while guiding the protruding portion of the first connector 150 into the first receiving opening 140, guiding the protruding portion of the second connector 350 into the second receiving opening 340 by tensioning the second rope-type guide element 330.

The embodiments/examples relating to the first connector 150 as described herein, may be understood to apply, mutatis mutandis, to the second connector 350.

The second connector 350 may be understood to be arranged proximate to the first connector 150. The second connector 350 may be understood to be provided on (the same side of) the mechanical damper apparatus 110 as the first connector 150.

The embodiments/examples relating to the first receiving opening 140 as described herein, may be understood to apply, mutatis mutandis, to the second receiving opening 340.

The second receiving opening 340 may be understood to be arranged proximate to the first receiving opening 140. The second receiving opening 340 may be understood to be provided on (the same side of) the tower 120 as the first receiving opening 140.

The embodiments/examples relating to the first fixing point as described herein, may be understood to apply, mutatis mutandis, to the second fixing point.

The second fixing point may be understood to be arranged proximate to the first fixing point. The second fixing point may be understood to be provided on (the same side of) the tower 120 as the first fixing point.

The embodiments/examples relating to the first rope-type guide element 130 as described herein, may be understood to apply, mutatis mutandis, to the second rope-type guide element 330. The second rope-type guide element 330 may be understood to be arranged proximate to the first rope-type guide element 130.

According to an embodiment, lowering the first end portion of the second rope-type guide element 330 to a second height position lower than the second fixing point includes letting out the second rope-type guide element 330 from inside the tower 120.

In an example, an operator inside the tower 120 may lower the first end portion of the second rope-type guide element 330 to the second height position.

In a further example, the first end portion of the second rope-type guide element 330 is lowered to the second height while keeping the second rope-type guide element 330 passed through the second receiving opening 340.

It may be understood that lowering the first end portion of the second rope-type guide element 330, facilitates a positioning of the first end portion of the second rope-type guide element 330 for being (easily) attached to the protruding portion of the second connector 350.

For example, lowering the first end portion of the second rope-type guide element 330 positions the first end portion of the first rope-type guide element 130 in proximity to the mechanical damper apparatus 110, e.g. at a base area of the tower 120, e.g. at substantially ground level or sea level.

The second height position may be understood to be substantially the same as the first height position.

According to an embodiment, attaching the first end portion of the second rope-type guide element 330 to the protruding portion of the second connector 350 of the mechanical damper apparatus 110 may be understood as reversibly or non-permanently attaching the first end portion of the second rope-type guide element 330 to the protruding portion of the second connector 350 of the mechanical damper apparatus 110.

For example, the first end portion of the second rope-type guide element 330 may include a hook-type end attachment, and the protruding portion of the second connector 350 of the mechanical damper apparatus 110 may include an eyebolt-type attachment, such that the hook-type end attachment of the second rope-type guide element 330 may be reversibly or non-permanently attached to the eyebolt-type attachment of the protruding portion of the second connector 350 of the mechanical damper apparatus 110.

As can be understood by the skilled person, other methods of attachment can be used, for example other reversible/non-permanent attachment methods (e.g. the protruding portion of the second connector 350 having an eyebolt, and tying/knotting the first end portion of the second rope-type guide element 330 to the eyebolt of the protruding portion of the second connector 350, or permanent attachment methods (e.g. adhesive or semi-permanent attachment methods (e.g. adhesive tape).

Guiding the protruding portion of the second connector 350 to the second receiving opening 340 by tensioning the second rope-type guide element 330 may be understood to effect a (pulling force on the protruding portion of the second connector 350 towards the second receiving opening 340.

It may be understood that during mounting 1050 of the mechanical damper apparatus 110 to the tower 120, an alignment of the second connector 350 of the mechanical damper apparatus 110 and the second receiving opening 340 is provided by a combination of a tension of the second rope-type guide element 330, and the second rope-type guide element 330 being in a state of passed through the second receiving opening 340, and the second rope-type guide element 330 being attached at the first end portion of the second rope-type guide element 330 to the protruding portion of the second connector 350.

Accordingly, the protruding portion of the second connector 350 may be guided into the second receiving opening 340, by an operator, easily, e.g. when view is partially or fully obstructed (e.g. without direct line of sight, or when the operator and mechanical damper apparatus are distant or remote from each other. Further, the mounting operation may be carried out remotely, e.g. from the ground and/or from inside the tower. Thus, an improved method of installation is provided.

According to a further aspect, there is provided a method of installing a mechanical damper apparatus 110 to an external surface of a tower 120 of a wind turbine, the tower 120 being in an erect state, the method including: passing 1110 a first rope-type guide element 130 through a receiving portion of a fourth connector 460; and while keeping the first rope-type guide element 130 passed through the receiving portion of the fourth connector 460, performing the following: attaching 1120 a first end portion of the first rope-type guide element 130 to a protruding portion of a third connector 450 of the mechanical damper apparatus 110, the third connector 450 configured for mating with the fourth connector 460, and attaching 1130 the fourth connector 460 to a first rope-type hoist element 430; lifting 1140 the fourth connector 460, using the first rope-type hoist element 430, to a first receiving opening 140 arranged at a first fixing point on the external surface of the tower 120, the first fixing point being for mounting the mechanical damper apparatus 110, at a mounting position, to the external surface of the tower 120; fixing 1150 the fourth connector 460 to the tower 120 at the first fixing point; and lifting 1160 the mechanical damper apparatus 110, and mounting 1170 the mechanical damper apparatus 110 to the external surface of the tower 120; wherein mounting 1170 the mechanical damper apparatus 110 to the tower 120 includes guiding the protruding portion of the third connector 450 into the receiving portion of the fourth connector 460 by tensioning the first rope-type guide element 130.

According to an embodiment, passing 1110 a first rope-type guide element 130 through a receiving portion of the fourth connector 460 may be understood as threading or sliding, one end (e.g. a first end) of the first rope-type guide element 130 through the receiving portion of the fourth connector 460.

The fourth connector 460 can be understood to be configured to connect the mechanical damper apparatus 110 to the tower 120.

According to an embodiment, the third connector 450 being configured for mating with the fourth connector 460 can be understood as the receiving portion of the fourth connector 460 being configured for receiving the protruding portion of the third connector 450 of the mechanical damper apparatus 110.

For example, (the receiving portion of) the fourth connector 460 may be an eyebolt-type element and (the protruding portion of) the third connector 450 may be a pin-type element.

In another example, the third connector includes a male-type connector and the fourth connector 460 includes a female-type connector.

As an illustrative example, (the receiving portion of) the fourth connector 460 has dimension(s) (e.g. diameter, length) for receiving the (the protruding portion of) the third connector 450.

As can be understood by the skilled person, other elements can be used in place of a pin-type element and an eyebolt-type element, as (the protruding portion of) the third connector 450 and (the receiving portion of) the fourth connector 460, respectively.

For example, a hook-type element or eyebolt-type element, and a peg-type element, as (the protruding portion of) the third connector 450 and (the receiving portion of) the fourth connector 460, respectively.

In an example, the third connector includes a female-type connector and the fourth connector 460 includes a male-type connector.

As may be understood by the skilled person, where connectors or elements are described to mate with each other, or connect with each other, the connectors or elements may be exchanged, or swapped, with each other, whilst still achieving the mating or connecting functionality.

According to an embodiment, attaching 1120 the first end portion of the first rope-type guide element 130 to a protruding portion of the third connector 450 of the mechanical damper apparatus 110 may be understood as reversibly or non-permanently attaching the first end portion of the first rope-type guide element 130 to a protruding portion of the third connector 450 of the mechanical damper apparatus 110.

For example, the first end portion of the first rope-type guide element 130 may include a hook-type end attachment, and the protruding portion of the third connector 450 of the mechanical damper apparatus 110 may include an eyebolt-type attachment, such that the hook-type end attachment of the first rope-type guide element 130 may be reversibly or non-permanently attached to the eyebolt-type attachment of the protruding portion of the third connector 450 of the mechanical damper apparatus 110.

As can be understood by the skilled person, other methods of attachment can be used, for example other reversible/non-permanent attachment methods (e.g. the protruding portion of the third connector 450 having an eyebolt, and tying/knotting the first end portion of the first rope-type guide element 130 to the eyebolt of the protruding portion of the third connector 450), or permanent attachment methods (e.g. adhesive) or semi-permanent attachment methods (e.g. adhesive tape).

In an example, the first rope-type guide element 130 has a diameter less than a diameter of the first receiving portion of the fourth connector 460. In an example, the first rope-type guide element 130 has a length at least a height of the tower 120, preferably at least 150% of a height of the tower 120, or more preferably at least twice a height of the tower 120.

According to an embodiment, attaching 1130 the fourth connector 460 to the first rope-type hoist element 430 may be understood as reversibly or non-permanently attaching the fourth connector 460 to the first rope-type hoist element 430.

For example, the first rope-type hoist element 430 may be attached to the fourth connector 460 using reversible/non-permanent methods (as described further herein), using permanent attachment methods (e.g. adhesive) or using semi-permanent attachment methods (e.g. adhesive tape).

In an example of a reversible/non-permanent method, the first rope-type hoist element 430 includes a hook-type end attachment (e.g. arranged at a first end portion of the first rope-type hoist element 430) which is configured to attach to the fourth connector 460, e.g. to an eyelet portion of the fourth connector 460 (the eyelet portion may be separate from the receiving portion, e.g. the eyelet portion may be arranged on an opposite end of the fourth connector 460 to the receiving portion), or e.g. to the receiving portion of the fourth connector 460.

In another example of a reversible/non-permanent method, the first rope-type hoist element 430 may be tied/knotted (e.g. at a first end portion of the first rope-type hoist element 430) to the receiving portion of the fourth connector 460.

Lifting 1140 the fourth connector 460, using the first rope-type hoist element 430, to the first receiving opening 140 may be understood as a lifting the fourth connector 460 (e.g. without lifting the mechanical damper apparatus 110), while keeping the first rope-type guide element 130 passed through the receiving portion of the fourth connector 460.

Lifting 1140 the fourth connector 460 may be understood as lifting in an upwards direction, e.g. from a base portion of the tower 120 towards the first fixing point. In an example, the fourth connector 460 may be lifted by pulling or drawing (e.g. from a second end portion of the first rope-type hoist element).

In an example, the first rope-type hoist element 430 has a diameter less than a diameter of the first receiving opening 140. In an example, the first rope-type hoist element 430 has a length at least 50% of a height of the tower 120, preferably at least 75% of a height of the tower 120, or more preferably at least a height of the tower 120.

A height of the tower 120 may be understood as a hub height of the wind turbine, or a height from a base of the tower 120 to the top of the tower 120.

According to an embodiment, fixing 1150 the fourth connector 460 to the tower 120 at the first fixing point includes securing the fourth connector 460 within the first receiving opening 140. In an example, fixing 1150 the fourth connector 460 to the tower 120 at the first fixing point includes tensioning or pulling the first rope-type hoist element 430 such that (an end portion opposite to the receiving portion of) the fourth connector 460 enters the first receiving opening 140 (first).

In an example, fixing the fourth connector 460 to the tower 120 at the first fixing point includes, where an end portion of the fourth connector 460 is a bolt-type end portion, securing the fourth connector 460 within the first receiving opening 140 using a nut-type device.

Mounting 1170 the mechanical damper apparatus 110 to the tower 120 may be understood as reversibly or non-permanently mounting the mechanical damper apparatus 110 to the external surface of the tower 120. For example, the mechanical damper apparatus 110 may be bolted onto the external surface of the tower 120.

Guiding the protruding portion of the third connector 450 into the receiving portion of the fourth connector 460 by tensioning the first rope-type guide element 130 may be understood to effect a (pulling) force on the protruding portion of the third connector 450 towards (the receiving portion of) the fourth connector 460.

It may be understood that during mounting 1170 of the mechanical damper apparatus 110 to the tower 120, an alignment of the third connector 450 of the mechanical damper apparatus 110 and (the receiving portion of) the fourth connector 460 is provided by a combination of a tension of the first rope-type guide element 130, and the first rope-type guide element 130 being in a state of passed through the receiving portion of the fourth connector 460, and the first rope-type guide element 130 being attached at the first end portion of the first rope-type guide element 130 to the protruding portion of the third connector 450.

Accordingly, the protruding portion of the third connector 450 may be guided into the receiving portion of the fourth connector 460, by an operator, easily, e.g. when view is partially or fully obstructed (e.g. without direct line of sight), and/or when the operator and mechanical damper apparatus are distant or remote from each other. Further, the mounting operation may be carried out remotely, e.g. from the ground and/or from inside the tower. Thus, an improved method of installation is provided.

According to an embodiment, the receiving portion of the fourth connector 460 is a ring-type element or eyebolt-type element and the protruding portion of the third connector 450 is a pin-type element.

According to an embodiment, mounting 1170 the mechanical damper apparatus 110 includes lowering the protruding portion of the third connector 450 into the receiving portion of the fourth connector 460.

According to an embodiment, the method includes supporting a weight of the mechanical damper apparatus 110 on at least the fourth connector 460.

In an example, a protruding portion of the fourth connector 460 may extend through a wall of the tower 120 (after the fourth connector 460 is fixed 1150 to the tower 120) such that a load may be transferred via the fourth connector 460 to the tower 120.

In a further example, the mechanical damper apparatus 110 may be lowered into the receiving portion of the fourth connector 460 by operation of a lifting apparatus carrying a weight of the mechanical damper apparatus 110 and/or tensioning of the first rope-type guide element 130.

According to an embodiment, fixing 1150 the fourth connector 460 to the tower 120 includes fixing the fourth connector 460 to the tower 120 from inside the tower 120, and/or securing the fourth connector 460 within the first receiving opening 140.

The first receiving opening 140 can be understood as an opening configured to receive or mate with a protruding portion of the fourth connector 460. For example, the first receiving opening 140 is a through-hole in the tower 120 configured for receiving the protruding portion of the fourth connector 460.

The fourth connector 460 and the first receiving opening 140 can be understood as being configured for connecting with each other. In an example, the fourth connector 460 may include a male-type connector and the first receiving opening 140 may be a female-type connector.

As an illustrative example, the fourth connector 460 may include a threaded portion and/or shank portion of an eyebolt-type element.

As a further illustrative example, the first receiving opening 140 may be a through-hole in the tower, e.g. a wall portion of the tower, having dimension(s) (e.g. diameter, length) for receiving the threaded portion and/or shank portion of an eyebolt-type element of the fourth connector 460.

As can be understood by the skilled person, other connection devices can be used in place of a threaded portion and/or shank portion of an eyebolt-type element, for example, a clevis pin-type connector (which may be secured by a split pin-type securing device).

According to an embodiment, tensioning the first rope-type guide element 130 includes pulling a second end portion of the first rope-type guide element 130, from a first height position lower than the first fixing point.

In an example, tensioning the first rope-type guide element 130 includes pulling (a second end portion of) the first rope-type guide element 130, from a first height position lower than the first fixing point.

In an example, the first height position may be understood as a position nearer to ground level or sea level, or nearer to a base of the tower 120, relative to the first fixing point.

In an example, the first height position is a position at a base portion of the tower 120 or within 10 m of a base of the tower 120.

According to an embodiment, the mechanical damper apparatus 110 includes a plurality of connectors 450, 750.

According to an embodiment, there are a plurality of rope-type guide elements 130, 330 for guiding a plurality of connectors 450, 750 into a plurality of receiving openings 140, 340.

According to an embodiment, the mechanical damper apparatus 110 includes a fifth connector 750 configured for mating with a sixth connector 760.

According to an embodiment, the sixth connector 760 is configured to be fixed to the tower 120 (at a second fixing point).

According to an embodiment, a method provided includes passing a second rope-type guide element 330 through a receiving portion of the sixth connector 760; and while keeping the second rope-type guide element 330 passed through the receiving portion of the sixth connector 760, and prior to the lifting 1160 of the mechanical damper apparatus 110, and prior to the mounting 1170 of the mechanical damper apparatus 110 to the tower 120, performing the following: attaching a first end portion of the second rope-type guide element 330 to a protruding portion of the fifth connector 750, and attaching the sixth connector 760 to a second rope-type hoist element; lifting the sixth connector 760, using the first rope-type hoist element, to a second receiving opening 340 arranged at a second fixing point on the external surface of the tower 120, the second fixing point being for mounting the mechanical damper apparatus 110, at the mounting position, to the external surface of the tower 120; and fixing the sixth connector 760 to the tower 120 at the second fixing point; wherein mounting 1170 the mechanical damper apparatus 110 to the tower 120 further includes: while guiding the protruding portion of the third connector 450 into the receiving portion of the fourth connector 460, guiding the protruding portion of the fifth connector 750 into the receiving portion of the sixth connector 760 by tensioning the second rope-type guide element 330.

The embodiments/examples relating to the third connector 450 as described herein, may be understood to apply, mutatis mutandis, to the fifth connector 750.

The fifth connector 750 may be understood to be arranged proximate to the third connector 450. The fifth connector 750 may be understood to be provided on (the same side of) the mechanical damper apparatus 110 as the third connector 450.

The embodiments/examples relating to the fourth connector 460 as described herein, may be understood to apply, mutatis mutandis, to the sixth connector 760.

According to an embodiment, attaching the first end portion of the second rope-type guide element 330 to the protruding portion of the fifth connector 750 of the mechanical damper apparatus 110 may be understood as reversibly or non-permanently attaching the first end portion of the second rope-type guide element 330 to the protruding portion of the fifth connector 750 of the mechanical damper apparatus 110.

For example, the first end portion of the second rope-type guide element 330 may include a hook-type end attachment, and the protruding portion of the fifth connector 750 of the mechanical damper apparatus 110 may include an eyebolt-type attachment, such that the hook-type end attachment of the second rope-type guide element 330 may be reversibly or non-permanently attached to the eyebolt-type attachment of the protruding portion of the fifth connector 750 of the mechanical damper apparatus 110.

As can be understood by the skilled person, other methods of attachment can be used, for example other reversible/non-permanent attachment methods (e.g. the protruding portion of the fifth connector 750 having an eyebolt, and tying/knotting the first end portion of the second rope-type guide element 330 to the eyebolt of the protruding portion of the fifth connector 750, or permanent attachment methods (e.g. adhesive or semi-permanent attachment methods (e.g. adhesive tape).

Guiding the protruding portion of the fifth connector 750 to the receiving portion of the sixth connector 760 by tensioning the second rope-type guide element 330 may be understood to effect a (pulling force on the protruding portion of the fifth connector 750 towards (the receiving portion of) the sixth connector 760.

It may be understood that during mounting 1170 of the mechanical damper apparatus 110 to the tower 120, an alignment of the fifth connector 750 of the mechanical damper apparatus 110 and (the receiving portion of) the sixth connector 760 is provided by a combination of a tension of the second rope-type guide element 330, and the second rope-type guide element 330 being in a state of passed through the receiving portion of the sixth connector 760, and the second rope-type guide element 330 being attached at the first end portion of the second rope-type guide element 330 to the protruding portion of the fifth connector 750.

Accordingly, the protruding portion of the fifth connector 750 may be guided into the receiving portion of the sixth connector 760, by an operator, easily, e.g. when view is partially or fully obstructed (e.g. without direct line of sight, or when the operator and mechanical damper apparatus are distant or remote from each other.

Further, the mounting operation may be carried out remotely, e.g. from the ground and/or from inside the tower. Thus, an improved method of installation is provided.

According to an embodiment, the lifting 1040, 1160 of the mechanical damper apparatus 110 is performed using a lifting apparatus 310.

According to an embodiment, after mounting 1050, 1170 the mechanical damper apparatus 110 to the tower 120, remotely unhooking the mechanical damper apparatus 110 from the lifting apparatus 310 using a remotely controlled hook device 320.

In an example, the operation of remotely unhooking the mechanical damper apparatus 110 from the lifting apparatus 310 may be performed from the ground and/or from inside the tower.

According to an embodiment, the method includes, following the mounting 1050, 1170 of the mechanical damper apparatus 110 to the tower 120, the method further includes removing at least a portion of a nacelle of the wind turbine.

In an example, the method includes, following the mounting 1050, 1170 of the mechanical damper apparatus 110 to the tower 120, the method further includes removing at least a portion of a nacelle of the wind turbine constituting, by weight, at least 25%, or at least 50% of a weight of the nacelle of the wind turbine.

In an illustrative example, the method is performed prior to removal of a nacelle of the wind turbine.

In an illustrative example, after mounting 1050 the mechanical damper apparatus 110 to the tower 120, an axis of the first connector 150 is substantially horizontal.

In an illustrative example, a method as described herein is performed prior to removal of rotor blades of the wind turbine.

In an illustrative example, a method as described herein includes, after mounting 1050, 1170 the mechanical damper apparatus 110 to the tower 120, verifying a mounted condition of the mechanical damper apparatus 110, using a borescope, from inside the tower 120.

The term '-type' as used herein, e.g. 'bolt-type', 'pin-type', 'nut-type', 'eyebolt-type', 'hook-type', 'rope-type', 'male-type', 'female-type' or 'crane-type', may be understood to include the term without '-type', e.g. 'bolt', 'pin', 'nut', 'eyebolt', 'hook', 'rope', 'male', 'female' or 'crane', respectively.

FIG. 1 is a diagrammatic rendering relating to the attaching 1030 of a first end portion of a first rope-type guide element 130 to a protruding portion of a first connector 150 of a mechanical damper apparatus 110. As an illustrative example, FIG. 1 shows the lowered 1020 first end portion of the first rope-type guide element 130 ready for being attached 1030 to the protruding portion of the first connector 150.

As illustrated, an operator may lower 1020 the first rope-type guide element 130 and/or keep the first rope-type guide element 130 passed through the first receiving opening 140.

It may be understood that lowering 1020 the first rope-type guide element 130 and/or keeping the first rope-type guide element 130 may be carried out by an operator inside the tower 120 and/or outside the tower 120 at ground level, or anywhere else.

Figure 2:
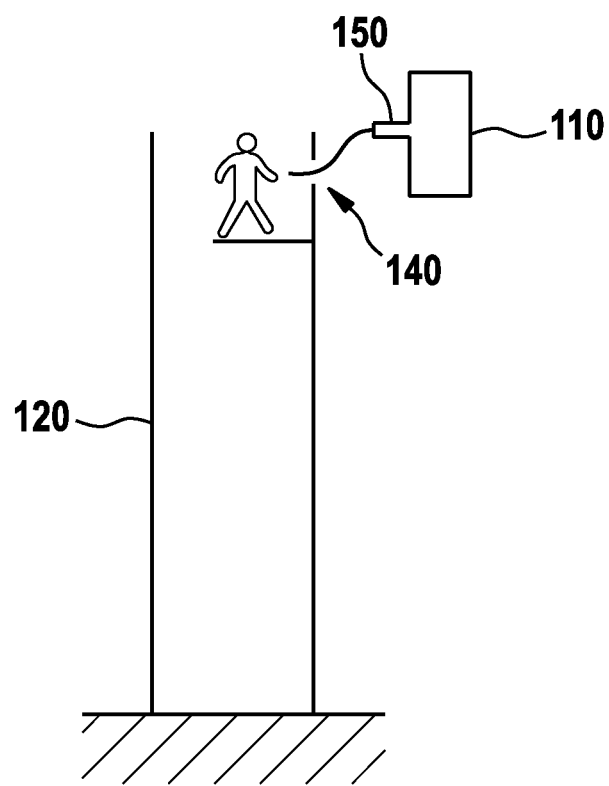
FIG. 2 is a diagrammatic rendering relating to the tensioning of a first rope-type guide element 130 according to an aspect described herein.

FIG. 2 is a diagrammatic rendering relating to the tensioning of a first rope-type guide element 130. As an illustrative example, FIG. 2 shows the mechanical damper apparatus 110 ready to be mounted 1170, wherein the mechanical damper apparatus 110 is shown to be in a state of being lifted, and the first rope-type guide element 130 in a state of being tensioned or about to be tensioned.

It may be understood that the first rope-type guide element 130 may (start to) be tensioned during lifting, such as to take up any slack in the first rope-type guide element 130 during lifting, or when the mechanical damper apparatus 110 is ready to be mounted 1170 or (only) during mounting 1170 of the mechanical damper apparatus 110.

It may be understood that tensioning the first rope-type guide element 130 may be carried out by an operator inside the tower 120 and/or outside the tower 120 at ground level, or anywhere else.

It may be understood that the tension of the first rope-type guide element 130 facilitates alignment of the first connector 150 and the first receiving opening 140, without requiring line-of-sight. Thus, an improved method of installation is provided.

Figure 3:
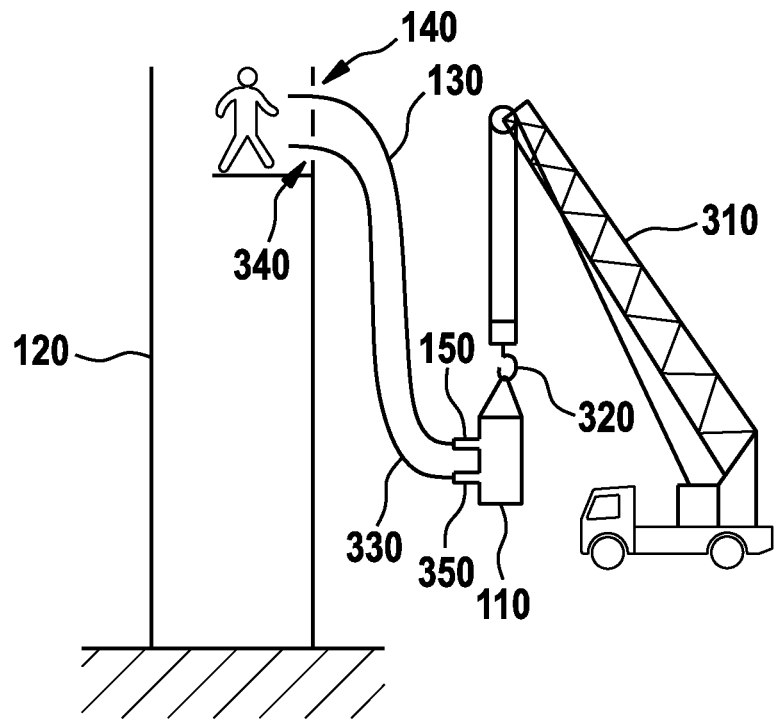
FIG. 3 is a diagrammatic rendering relating to the lifting of a mechanical damper apparatus 110 according to embodiments described herein.

FIG. 3 is a diagrammatic rendering relating to the lifting of a mechanical damper apparatus 110. As an illustrative example, FIG. 3 shows the mechanical damper apparatus being lifted 1040 by a lifting apparatus 310.

As an illustrative example, FIG. 3 shows a second rope-type guide element 330 passed through a second receiving opening 340, the second rope-type guide element 330 attached at a first end of the second rope-type guide element 330 to a second connector 350, according to embodiments described herein.

As an illustrative example, FIG. 3 shows a remotely controlled hook device 320 according to embodiments described herein.

According to embodiments described herein, the plurality of rope-type guide elements 130, 330 particularly eases mounting of a mechanical damper apparatus 110 having a plurality of connectors 150, 350. It may be understood that the challenge of aligning a plurality of connections, especially from the ground, or from inside the tower 120, is thus facilitated.

According to embodiments described herein, a remotely controlled hook device 320 facilitates the mounting of a mechanical damper apparatus 110, as the lifting apparatus 310 may be disconnected remotely, e.g. from the ground.

Thus, an improved method of installation is provided.

Figure 4:
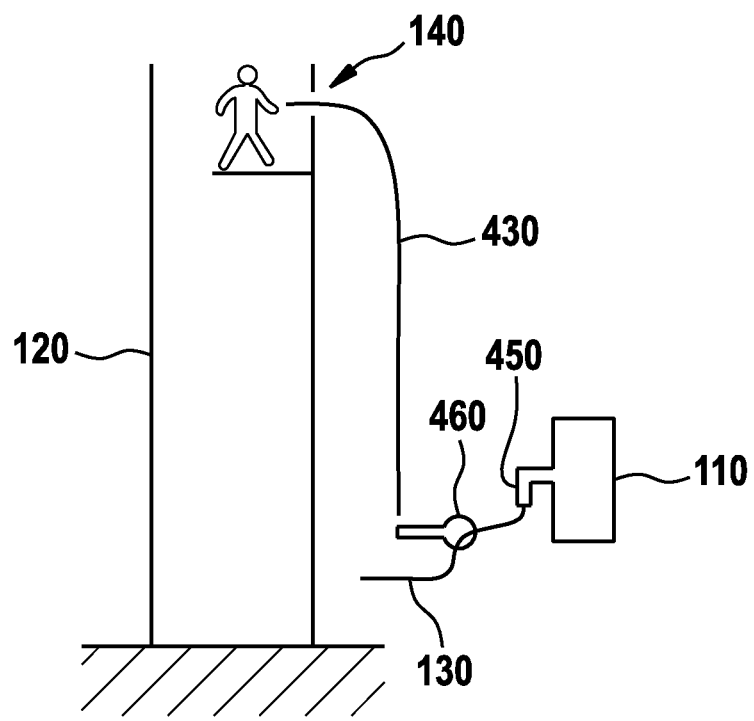
FIG. 4 is a diagrammatic rendering relating to the attaching of a first rope-type hoist element 430 to a fourth connector 460 according to a further aspect described herein.

FIG. 4 is a diagrammatic rendering relating to the attaching of a first rope-type hoist element 430 to a fourth connector 460. As an illustrative example, FIG. 4 shows a first end portion of the first rope-type hoist element 430 ready for being attached 1130 to the fourth connector 460.

As an illustrative example, FIG. 4 shows the first rope-type guide element 130 in a state of being passed 1110 through the receiving portion of the fourth connector 460, and in a state of being attached 1120 at the first end portion of the first rope-type guide element 130 to the protruding portion of the third connector 450.

Figure 5:
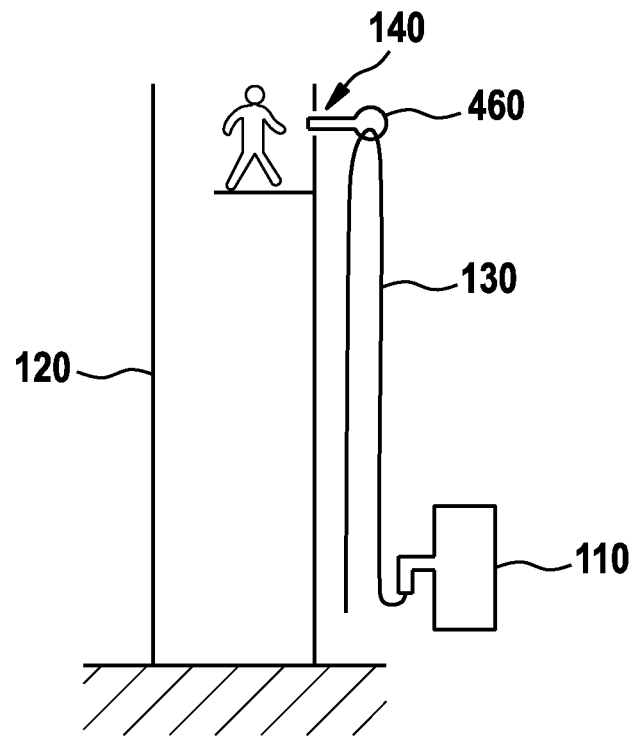
FIG. 5 is a diagrammatic rendering relating to the lifting of a fourth connector 460 to a first receiving opening 140 arranged at a first fixing point on the external surface of the tower 120 according to a further aspect described herein.

FIG. 5 is a diagrammatic rendering relating to the lifting of a fourth connector 460 to a first receiving opening 140 arranged at a first fixing point on the external surface of the tower 120. As an illustrative example, FIG. 5 shows the fourth connector 460, ready to be fixed 1150, or already fixed 1150 to the tower 120, while the first rope-type guide element 130 is kept passed 1110 through the receiving portion of the fourth connector 460, and while the first end portion of the first rope-type guide element 130 is attached 1120 to the protruding portion of the third connector 450.

Figure 6:
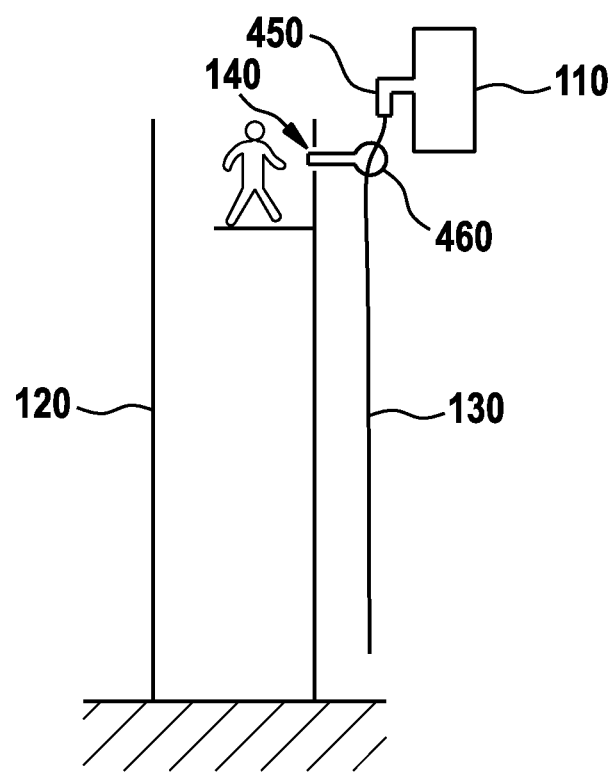
FIG. 6 is a diagrammatic rendering relating to the tensioning of a first rope-type guide element 130 according to a further aspect described herein.

FIG. 6 is a diagrammatic rendering relating to the tensioning of a first rope-type guide element 130. As an illustrative example, FIG. 6 shows the mechanical damper apparatus 110 ready to be mounted 1170, wherein the mechanical damper apparatus 110 is shown to be in a state of being lifted, and the first rope-type guide element 130 in a state of being tensioned or about to be tensioned.

It may be understood that the first rope-type guide element 130 may (start to) be tensioned during lifting, such as to take up any slack in the first rope-type guide element 130 during lifting, or when the mechanical damper apparatus 110 is ready to be mounted 1170 or (only) during mounting 1170 of the mechanical damper apparatus 110.

It may be understood that tensioning the first rope-type guide element 130 may be carried out by an operator outside the tower 120 at ground level, or anywhere else.

It may be understood that the tension of the first rope-type guide element 130 facilitates alignment of the protruding portion of the third connector 450 and the receiving portion of the fourth connector 460, without requiring line-of-sight. Thus, an improved method of installation is provided.

Figure 7:
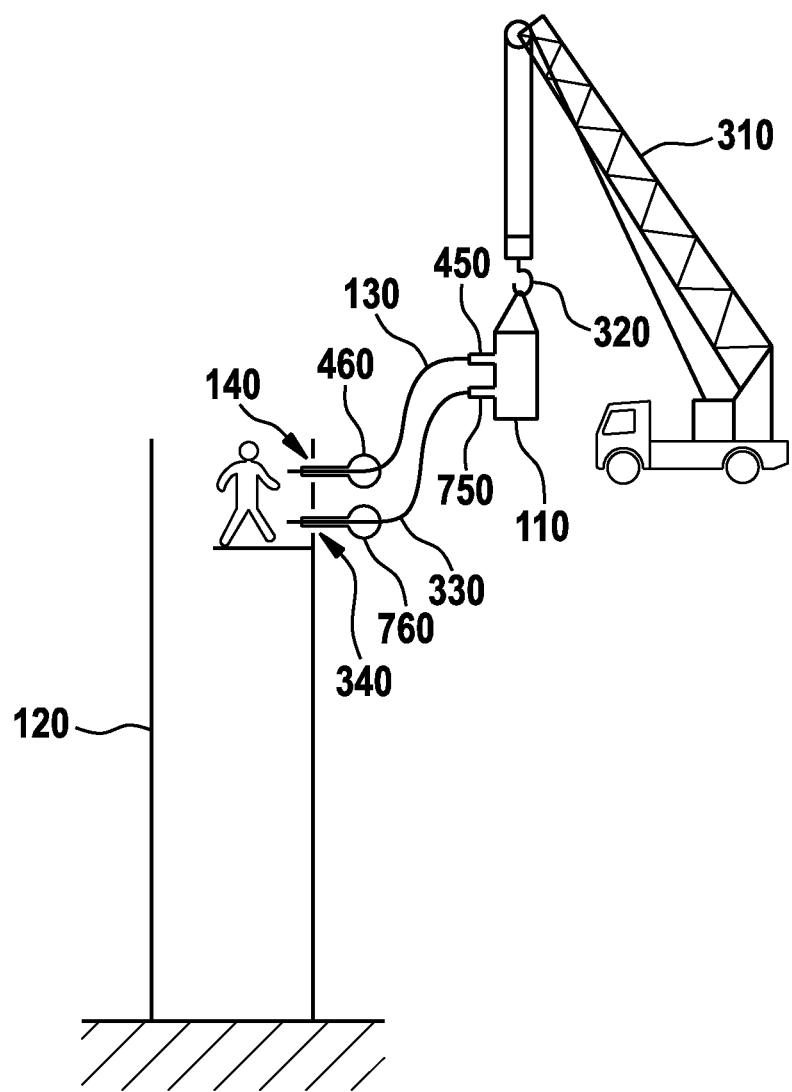
FIG. 7 is a diagrammatic rendering relating to the lifting of a mechanical damper apparatus 110 according to further embodiments described herein.

FIG. 7 is a diagrammatic rendering relating to the lifting of a mechanical damper apparatus 110. As an illustrative example, FIG. 7 shows the mechanical damper apparatus being lifted 1160 by a lifting apparatus 310.

As an illustrative example, FIG. 7 shows a second rope-type guide element 330 passed through a receiving portion of a sixth connector 760, the second rope-type guide element 330 attached at a first end of the second rope-type guide element 330 to a fifth connector 750, according to embodiments described herein.

As an illustrative example, FIG. 7 shows a remotely controlled hook device 320 according to embodiments described herein.

According to embodiments described herein, the plurality of rope-type guide elements 130, 330 particularly eases mounting of a mechanical damper apparatus 110 having a plurality of connectors 450, 750. It may be understood that the challenge of aligning a plurality of connections, especially from the ground, or from inside the tower 120, is thus facilitated.

Thus, an improved method of installation is provided.

Figure 8:
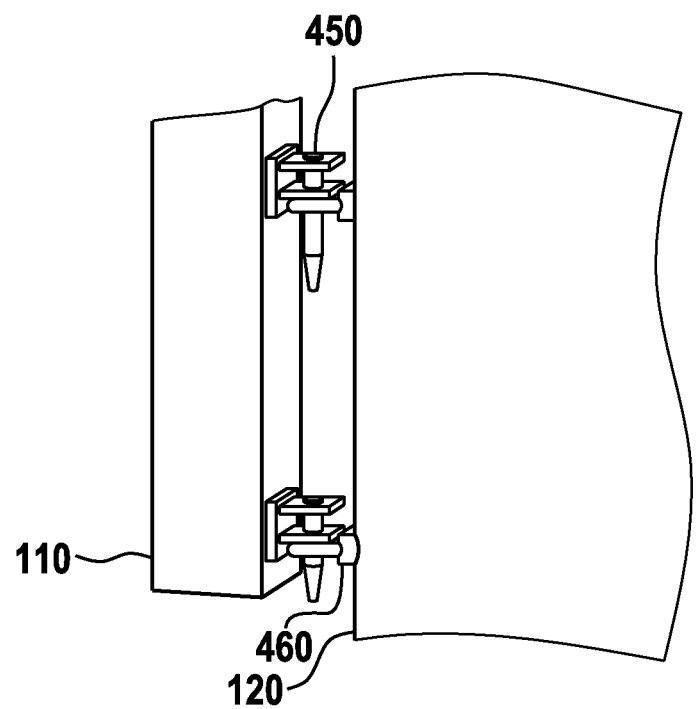
FIG. 8 is an illustration depicting a protruding portion of the third connector 450 and a receiving portion of the fourth connector 460 according to a further aspect described herein.

FIG. 8 is an illustration depicting a protruding portion of the third connector 450 and a receiving portion of the fourth connector 460. As an illustrative example, the third connector 450 is shown to be of the mechanical damper apparatus 110, and the fourth connector 460 is shown fixed to the tower 120.

Figure 9:
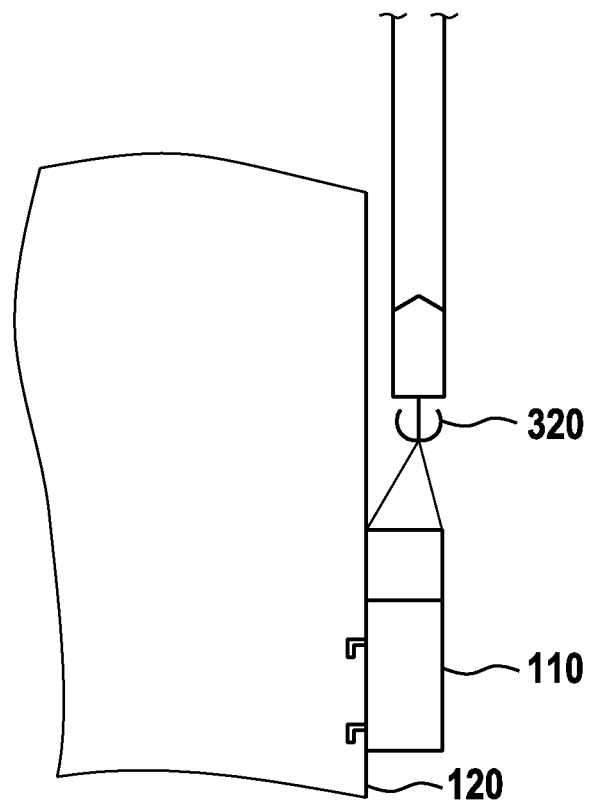
FIG. 9 is an illustration depicting a remotely controlled hook device 320 and a mounted mechanical damper apparatus 110 according to embodiments described herein.

FIG. 9 is an illustration depicting a remotely controlled hook device 320 and a mounted mechanical damper apparatus 110. As an illustrative example, the mechanical damper apparatus 110 is shown to be already mounted 1050, 1170 to the tower 120, and the remotely controlled hook device 320 about to be remotely operated to remotely unhook the mechanical damper apparatus 110 from a lifting apparatus 310 (not shown).

Figure 10:
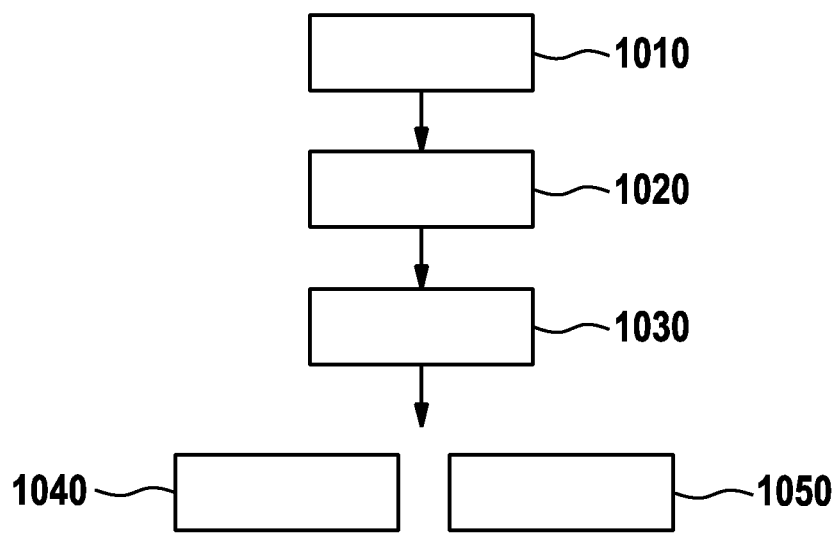
FIG. 10 is a diagram of a method of installing a mechanical damper apparatus 110 to an external surface of a tower 120 of a wind turbine according to an aspect described herein.

FIG. 10 is a diagram of a method of installing a mechanical damper apparatus 110 to an external surface of a tower 120 of a wind turbine. FIG. 10 shows the method including passing 1010 a first rope-type guide element 130 through a first receiving opening 140, lowering 1020 a first end portion of the first rope-type guide element 130 to a first height position, attaching 1030 the first end portion of the first rope-type guide element 130 to a protruding portion of a first connector 150 of a mechanical damper apparatus 110, and lifting 1040 the mechanical damper apparatus 110, and mounting 1050 the mechanical damper apparatus 110 to the tower 120, according to an aspect described herein.

It may be understood that tensioning the first rope-type guide element 130 (as part of mounting 1050 the mechanical damper apparatus 110 to the tower 120) may be performed before or after or concurrently with lifting 1040 the mechanical damper apparatus 110.

Figure 11:
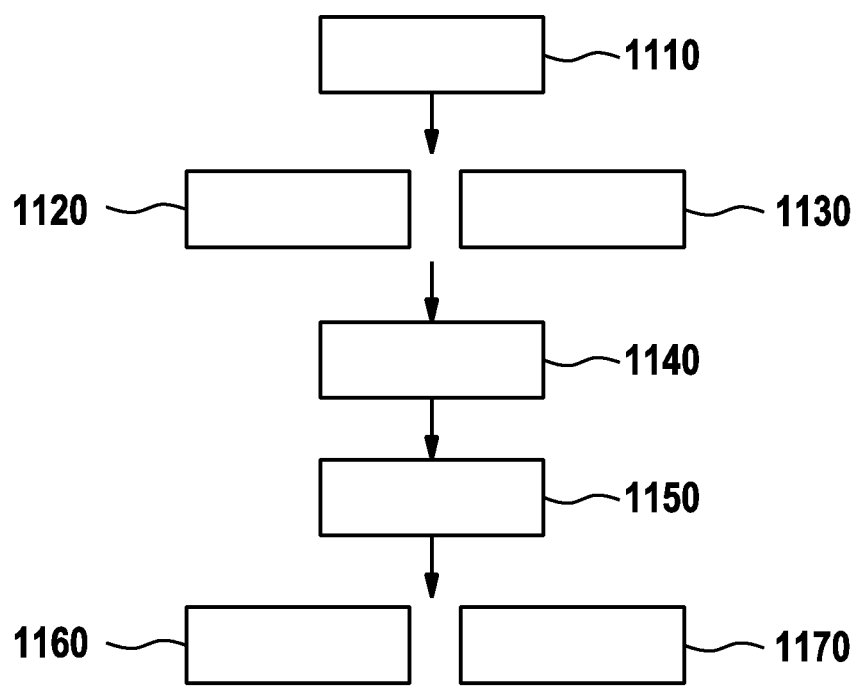
FIG. 11 is a diagram of a method of installing a mechanical damper apparatus 110 to an external surface of a tower 120 of a wind turbine according to a further aspect described herein.

FIG. 11 is a diagram of a method of installing a mechanical damper apparatus 110 to an external surface of a tower 120 of a wind turbine. FIG. 11 shows the method including passing 1110 a first rope-type guide element 130 through a receiving portion of a fourth connector 460, attaching 1120 a first end portion of the first rope-type guide element 130 to a protruding portion of a third connector 450 of the mechanical damper apparatus 110, and attaching 1130 the fourth connector 460 to a first rope-type hoist element 430, lifting 1140 the fourth connector 460 to a first receiving opening 140, fixing 1150 the fourth connector 460 to the tower 120, and lifting 1160 the mechanical damper apparatus 110, and mounting 1170 the mechanical damper apparatus 110 to the tower 120, according to an aspect described herein.

It may be understood that attaching 1120 the first end portion of the first rope-type guide element 130 to the protruding portion of the third connector 450 of the mechanical damper apparatus 110, may be performed before or after or concurrently with attaching 1130 the fourth connector 460 to the first rope-type hoist element 430.

It may be understood that tensioning the first rope-type guide element 130 (as part of mounting 1170 the mechanical damper apparatus 110 to the tower 120) may be performed before or after or concurrently with lifting 1160 the mechanical damper apparatus 110.

According to an example, it is described de-mounting the mechanical damper apparatus 110 from the external surface of the tower 120.

In an example, de-mounting the mechanical damper apparatus 110 includes guiding the protruding portion of the first connector 150 out of the first receiving opening 140, e.g. by pushing (from inside the tower 120) or by pulling using a further rope-type guide element.

In an example, de-mounting the mechanical damper apparatus includes guiding the protruding portion of the third connector 450 out of the receiving portion of the fourth connector 460, e.g. by pushing (from inside the tower 120) or by pulling using a further rope-type guide element.

In an example, the further rope-type guide element is attached at a first end portion of the further rope-type guide element to the mechanical damper apparatus 110, and may be pulled from a second end portion of the further rope-type guide element. In an example, the further rope-type guide element is operated/pulled, via at least one pulley element, from a height position lower than the first fixing point.

In an example, de-mounting the mechanical damper apparatus 110 includes releasing (or un-securing) the first connector 150 from the tower 120 from inside the tower 120 and/or releasing (or un-securing) the protruding portion of the first connector 150 from within the first receiving opening 140.

In an example, de-mounting the mechanical damper apparatus 110 includes releasing (or un-fixing) the fourth connector 460 from the tower 120 from inside the tower 120 and/or releasing (or un-securing) the fourth connector 460 from within the first receiving opening 140.

In an example, de-mounting the mechanical damper apparatus 110 includes supporting a weight of the mechanical damper apparatus 110 (during releasing (or un-securing) the first connector 150 from the tower 120, and/or during guiding the protruding portion of the first connector 110 out of the first receiving opening 140), e.g. using the lifting apparatus 310.

In an example, the lifting apparatus 310 is a crane-type apparatus. In an example, the lifting apparatus 310 includes a crane hook.

According to an example, supporting a weight of the mechanical damper apparatus 110 (or de-mounting the mechanical damper apparatus 110) includes catching a hook element of the mechanical damper apparatus 110 with a crane hook of the lifting apparatus 310.

In an example, the hook element of the mechanical damper apparatus 110 has a dimension (e.g. width, length, and/or a dimension in a direction extending away from the mechanical damper apparatus 110) of at least 50% or at least 100% of a diameter or width of the mechanical damper apparatus 110. In an example, the hook element of the mechanical damper apparatus 110 is configured to be large enough to be caught by a crane hook or an eye hook or a lifting hook or an open hook or an un-closed hook. Accordingly, a remotely controlled hook device 320 can be neglected/unnecessary during de-mounting/disassembly.

In an example, de-mounting (or disassembly) of the mechanical damper apparatus 110 includes supporting a weight of (or lifting) the mechanical damper apparatus 110 while tensioning the first rope-type guide element 130. Accordingly, the protruding portion of the first connector 150 may be guided out of the first receiving opening 140 in a simple manner, e.g. without any particular further equipment or method.

In an example, de-mounting (or disassembly) of the mechanical damper apparatus 110 includes supporting a weight of (or lifting) the mechanical damper apparatus 110 while tensioning the first rope-type guide element 130. Accordingly, the protruding portion of the third connector 450 may be guided out of the receiving portion of the fourth connector 460 in a simple manner, e.g. without any particular further equipment or method.

According to an example, de-mounting the mechanical damper apparatus 110 may be performed directly (or immediately) prior to, or directly (or immediately) following, the assembly or re-assembly of the nacelle and/or rotor blades of the wind turbine.

Accordingly, the aspects, embodiments, and examples described herein improves the installing of a mechanical damper apparatus to a tower of a wind turbine when the tower is in an erect state. In particular, the methods described herein provide a durable, long-term solution.

The present written description uses embodiments and examples to provide enabling disclosure. The scope of the present invention is defined by the claims.

The invention claimed is:

1. A method of installing a mechanical damper apparatus to an external surface of an erect tower of a wind turbine, the method comprising:
   passing a first rope-type guide element through a first receiving opening arranged at a first fixing point on the external surface of the erect tower, the first fixing point for mounting the mechanical damper apparatus at a mounting position to the external surface of the erect tower;
   while keeping the first rope-type guide element passed through the first receiving opening, performing the following:
      lowering a first end portion of the first rope-type guide element to a first height position lower than the first fixing point;
      attaching the first end portion of the first rope-type guide element to a protruding portion of a first connector of the mechanical damper apparatus, the first connector configured for mating with the first receiving opening;
      lifting the mechanical damper apparatus vertically along the erect tower, and tensioning the first rope-type guide element and guiding the protruding portion of the first connector into the first receiving opening to mount the mechanical damper apparatus to the external surface of the erect tower.

2. The method according to claim 1, further comprising, after guiding the protruding portion of the first connector into the first receiving opening, securing the first connector to the erect tower from inside the tower.

3. The method according to claim 1, wherein mounting the mechanical damper apparatus to the external surface of the erect tower comprises securing the protruding portion of the first connector within the first receiving opening.

4. The method according to claim 1, wherein tensioning the first rope-type guide element comprises pulling a second end portion of the first rope-type guide element from inside of the erect tower.

5. The method according to claim 1, wherein lowering the first end portion of the first rope-type guide element comprises letting out the first rope-type guide element from inside of the erect tower.

6. The method according to claim 1, wherein the mechanical damper apparatus includes a second connector configured to mate with a second receiving opening arranged at a second fixing point to mount the mechanical damper apparatus at the mounting position to the external surface of the erect tower, the method further comprising:
   passing a second rope-type guide element through the second receiving opening;
   while keeping the second rope-type guide element passed through the second receiving opening, and prior to the lifting of the mechanical damper apparatus and prior to mounting the mechanical damper apparatus to the erect tower, performing the following:
      lowering a first end portion of the second rope-type guide element to a second height position lower than the second fixing point;
      attaching the first end portion of the second rope-type guide element to a protruding portion of the second connector;
   wherein mounting the mechanical damper apparatus to the tower further comprises:
      while guiding the protruding portion of the first connector into the first receiving opening, guiding the protruding portion of the second connector into the second receiving opening by tensioning the second rope-type guide element.

7. A method of installing a mechanical damper apparatus to an external surface of an erect tower of a wind turbine, the method comprising:
   passing a first rope-type guide element through a receiving portion of a first connector that is unattached to the mechanical damper apparatus;
   while keeping the first rope-type guide element passed through the receiving portion of the first connector, performing the following:
      attaching a first end portion of the first rope-type guide element to a protruding portion of a second connector on the mechanical damper apparatus, the second connector configured for mating with the first connector, and attaching the first connector to a first rope-type hoist element;
      lifting the first connector, using the first rope-type hoist element, to a first receiving opening arranged at a first fixing point on the external surface of the erect tower for mounting the mechanical damper apparatus at a mounting position to the external surface of the tower;
      fixing the first connector to the tower at the first fixing point;
      lifting the mechanical damper apparatus with attached second connector, and mounting the mechanical damper apparatus to the external surface of the tower by tensioning the first rope-type guide element and guiding the protruding portion of the second connector into the receiving portion of the first connector.

8. The method according to claim 7, wherein the receiving portion of the first connector is a ring-type element and the protruding portion of the second connector is a pin-type element, and wherein mounting the mechanical damper apparatus further comprises lowering the protruding portion of the second connector into the receiving portion of the first connector, and supporting a weight of the mechanical damper apparatus on at least the first connector.

9. The method according to claim 7, comprising fixing the first connector to the tower from inside the erect tower, and securing the first connector within the first receiving opening.

10. The method according to claim 7, wherein tensioning the first rope-type guide element comprises pulling a second end portion of the first rope-type guide element from a first height position lower than the first fixing point.

11. The method according to claim 7, wherein the mechanical damper apparatus includes a third connector configured thereon for mating with a fourth connector at the mounting position, the method further comprising:
passing a second rope-type guide element through a receiving portion of the fourth connector;
while keeping the second rope-type guide element passed through the receiving portion of the fourth connector, and prior to the lifting of the mechanical damper apparatus and mounting of the mechanical damper apparatus to the erect tower, performing the following:
attaching a first end portion of the second rope-type guide element to a protruding portion of the third connector and attaching the fourth connector to a second rope-type hoist element;
lifting the fourth connector, using the first rope-type hoist element, to a second receiving opening arranged at a second fixing point on the external surface of the tower for mounting the mechanical damper apparatus at the mounting position to the external surface of the tower;
fixing the fourth connector to the tower at the second fixing point;
wherein mounting the mechanical damper apparatus to the tower further comprises:
while guiding the protruding portion of the second connector into the receiving portion of the first connector, guiding the protruding portion of the third connector into the receiving portion of the fourth connector by tensioning the second rope-type guide element.

12. The method according to claim 7, wherein the lifting of the mechanical damper apparatus is performed using a lifting apparatus, and the method further comprising, after mounting the mechanical damper apparatus to the tower, remotely unhooking the mechanical damper apparatus from the lifting apparatus using a remotely controlled hook device.

13. The method according to claim 7, wherein, following the mounting of the mechanical damper apparatus to the tower, the method further comprises removing at least a portion of a nacelle of the wind turbine.

* * * * *